(12) United States Patent
Balakrishnan et al.

(10) Patent No.: US 8,498,349 B2
(45) Date of Patent: Jul. 30, 2013

(54) DEMODULATION AND DECODING FOR FREQUENCY MODULATION (FM) RECEIVERS WITH RADIO DATA SYSTEM (RDS) OR RADIO BROADCAST DATA SYSTEM (RBDS)

(75) Inventors: Jaiganesh Balakrishnan, Bangalore (IN); Aravind Ganesan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 626 days.

(21) Appl. No.: 12/720,688

(22) Filed: Mar. 10, 2010

(65) Prior Publication Data
US 2010/0232548 A1    Sep. 16, 2010

(30) Foreign Application Priority Data
Mar. 11, 2009    (IN) .............................. 548/CHE/2009

(51) Int. Cl.
*H04K 1/10* (2006.01)
*H04B 1/38* (2006.01)
*G01R 31/08* (2006.01)

(52) U.S. Cl.
USPC ............................ 375/260; 375/222; 370/232

(58) Field of Classification Search
USPC .................................. 375/222, 260; 370/232
See application file for complete search history.

(56) References Cited

U.S. PATENT DOCUMENTS

| | | | | |
|---|---|---|---|---|
| 5,010,554 A | * | 4/1991 | Bechtel et al. ................. | 714/759 |
| 5,677,919 A | * | 10/1997 | Antia ............................. | 714/784 |
| 5,692,020 A | * | 11/1997 | Robbins ........................ | 375/350 |
| 5,761,240 A | * | 6/1998 | Croucher, Jr. ................. | 375/224 |
| 5,926,490 A | * | 7/1999 | Reed et al. .................... | 714/787 |
| 6,009,549 A | * | 12/1999 | Bliss et al. .................... | 714/769 |
| 6,829,307 B1 | * | 12/2004 | Hoo et al. ..................... | 375/260 |
| 7,003,100 B2 | * | 2/2006 | Lai et al. .................... | 379/406.1 |
| 2002/0046382 A1 | * | 4/2002 | Yang ............................. | 714/758 |
| 2002/0093913 A1 | * | 7/2002 | Brown et al. ................. | 370/232 |
| 2003/0108094 A1 | * | 6/2003 | Lai et al. ....................... | 375/222 |
| 2003/0118130 A1 | * | 6/2003 | Greenberg et al. ........... | 375/340 |
| 2003/0126551 A1 | * | 7/2003 | Mantha et al. ................ | 714/790 |

OTHER PUBLICATIONS

John G Proakis, "Differential PSK (DPSK) and its Performance", "Digital Communication", 1995, p. 274-275, Third Edition, Mc Graw Hill Publication.

* cited by examiner

*Primary Examiner* — Leon-Viet Nguyen
*Assistant Examiner* — Sarah Hassan
(74) *Attorney, Agent, or Firm* — Ronald O. Neerings; Wade James Brady, III; Frederick J. Telecky, Jr.

(57) ABSTRACT

Demodulation and decoding for frequency modulation (FM) receivers with radio data system (RDS) or radio broadcast data system (RBDS). An example of a method for processing a signal in a receiver includes quantizing a demodulated signal to generate bits in response to receipt of the demodulated signal. The method also includes grouping the bits into one or more blocks. The method further includes computing a syndrome for a block from the one or more blocks. Moreover, the method includes identifying error, corresponding to the syndrome, in the block based on type of demodulation. The type of demodulation includes a coherent demodulation and a differential demodulation. Furthermore, the method includes correcting the error in the block.

15 Claims, 7 Drawing Sheets

DEMODULATION AND DECODING FOR FREQUENCY MODULATION (FM) RECEIVERS WITH RADIO DATA SYSTEM (RDS) OR RADIO BROADCAST DATA SYSTEM (RBDS)

REFERENCE TO PRIORITY APPLICATION

This application claims priority from Indian Provisional Application Serial No. 548/CHE/2009 filed Mar. 11, 2009, entitled "METHOD AND APPARATUS FOR JOINT DEMODULATION AND DECODING IN FM RDS RECEIVERS NETWORKS", having same inventors and assigned to same assignee Texas Instruments Incorporated, which is incorporated herein by reference in its entirety.

TECHNICAL FIELD

Embodiments of the disclosure relate to demodulation and decoding techniques for frequency modulation (FM) receivers with radio data system (RDS) or radio broadcast data system (RBDS).

BACKGROUND

A frequency modulation (FM) receiver uses a radio data system (RDS) unit or a radio broadcast data system (RBDS) unit for processing specific data, for example station identification, song title, time, program identification, and name of artists, received from a broadcast station. The data is encoded and modulated before transmission. The data can also be referred to as digital information. The FM receiver receives a signal, and demodulates and decodes the signal using the RDS unit or the RBDS unit to obtain the data. Sensitivity of the RDS unit or the RBDS unit determines range and operating conditions in which the data can be decoded reliably and displayed to a user. To improve user experience it is desired to improve processing of the signal including the data and hence improve the sensitivity of the RDS unit or the RBDS unit.

Typically, the data is encoded using a shortened cyclic code and modulated using a differential binary phase shift keying (BPSK) modulation scheme. In one existing technique, the FM receiver uses a differential demodulation technique for demodulation and a burst error correction technique for error correction in demodulation and decoding. However, the burst error correction technique can only correct errors that occur in a burst (consecutive locations) with a burst length not exceeding five. For example, the burst error correction technique can correct bit errors occurring in consecutive locations in a bit length of 5. Hence, only a low percentage of 2-bit errors occurring in a block processed by the burst error correction technique can be corrected and thus the burst error correction technique is not optimal in presence of additive white Gaussian noise that is often present. The differential demodulation technique also results in low performance gain in decibels and low sensitivity performance.

SUMMARY

An example of a method for processing a signal in a receiver includes quantizing a demodulated signal to generate bits in response to receipt of the demodulated signal. The method also includes grouping the bits into one or more blocks. The method further includes computing a syndrome for a block from the one or more blocks. Moreover, the method includes identifying error, corresponding to the syndrome, in the block based on type of demodulation. The type of demodulation includes a coherent demodulation and a differential demodulation. Furthermore, the method includes correcting the error in the block.

An example of a method includes determining potential errors in a block of bits based on type of demodulation of the block of bits. The type of demodulation includes a coherent demodulation and a differential demodulation. The method also includes computing syndromes for the potential errors. The method further includes filtering the potential errors that yield identical syndromes. Moreover, the method includes storing the syndromes as predefined syndromes and corresponding potential errors as predefined errors for each type of demodulation in a receiver, thereby enabling identification and correction of error in an input signal when the input signal is received by the receiver. One predefined syndrome corresponds to one predefined error.

An example of a receiver for processing a signal includes one of a radio data system (RDS) error corrector and a radio broadcast data system (RBDS) error corrector that is responsive to a block of bits of a demodulated signal to compute a syndrome for the block; to identify error, corresponding to the syndrome, in the block based on type of demodulation; and to correct the error in the block. The type of demodulation includes a coherent demodulation and a differential demodulation.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the disclosure.

DETAILED DESCRIPTION OF THE EMBODIMENTS

Figure 1:
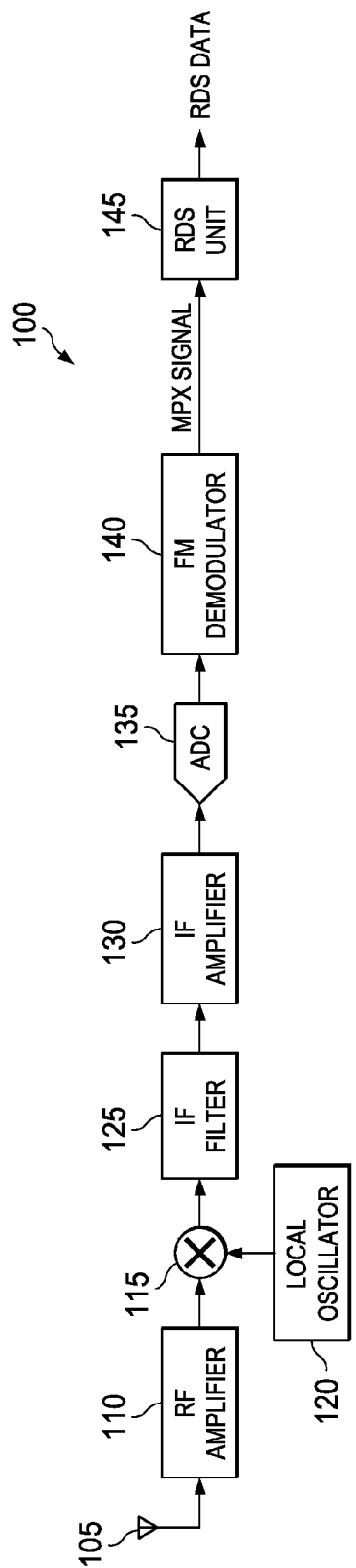
FIG. 1 illustrates an environment, in accordance with one embodiment.

FIG. 1 illustrates an environment, for example a receiver 100 having capability of processing radio data system (RDS) component or radio data broadcast system (RBDS) component of a signal. A receiver having capability of processing RDS or RBDS component of a signal can be referred to as an RDS receiver or an RBDS receiver, respectively. The receiver 100 can be present in various electronic devices, for example a mobile phone, a digital audio player, a stereo, a car radio, and a navigation device. The receiver 100 can be a frequency modulation (FM) receiver having capability of processing RDS or RBDS component of the signal.

The receiver 100 includes an antenna 105 that receives a signal. The antenna 105 is coupled to a radio frequency (RF) amplifier 110 that amplifies the signal and processes RF component of the signal. The RF amplifier 110 is coupled to an input of a mixer 115. A local oscillator (LO) 120 is coupled to another input of the mixer 115. The LO 120 is capable of generating a sine signal and a cosine signal. The mixer 115 multiplies the signal with the sine signal and the cosine signal from the LO 120. The LO 120 and the mixer 115 can include a plurality of LOs and a plurality of mixers respectively. An output from the mixer 115 includes in-phase and quadrature components of the signal. The mixer 115 is coupled to an intermediate frequency (IF) filter 125. The IF filter 125 processes the output from the mixer 115 to generate an IF signal. The IF filter 125 is coupled to an IF amplifier 130 that amplifies the IF signal. The IF amplifier 130 is coupled to an analog-to-digital converter (ADC) 135 that converts the IF signal into digital samples. The ADC 135 is coupled to an FM demodulator 140 that demodulates the digital samples to generate an input multiplexed (MPX) signal.

In one example, the input multiplexed signal includes a mono component centered at 0 kilohertz (KHz), a pilot carrier at 19 KHz, a stereo component centered at 38 KHz, and an RDS component centered at 57 KHz. In another example, the pilot carrier can be absent. The mono component can be used by FM receivers with a single audio output and the stereo component can be used by FM stereo receivers with left and right audio outputs. The mono component can also be used by the FM stereo receivers in case a signal-to-noise ratio (SNR) of the input multiplexed signal is low, as the FM stereo receivers are dependent on reception quality. The pilot carrier can be used to coherently demodulate the stereo component at the receiver 100. The pilot carrier can also be used to coherently demodulate the RDS component. The RDS component can be referred to as digital information or RDS data, and can be 2.4 KHz wide. Examples of the RDS data include, but are not limited to, station identification, song title, time, traffic information, global positioning system (GPS) assistance, program identification, and name of artists. The FM signal including the RDS component can be transmitted by a broadcast station after modulation. The RDS data can be encoded using a shortened cyclic code, for example (26, 16) shortened cyclic code. 26 bits represents total bits of the code. 26 bits include 16 message bits and 10 parity bits. The RDS data can then be modulated using differential binary phase shift keying modulation technique.

A (n, k) linear block code (C) can be referred to as a cyclic code if every cyclic shift of C is also a code vector of C. For example, let C1=0111001 be a code vector of C. C2=1011100, obtained by shifting one bit to right, is also a code vector of C and hence C can be called a cyclic code.

A block of k message bits can be encoded into a block of n bits by adding (n-k) number of check bits. Such a code is called (n, k) block code. The (n-k) check bits can be derived from the k message bits. An (n, k) block code is called an (n, k) linear block code if for any two code words, for example C1 and C2, belonging to a set of (n, k) block code, C1 XOR C2 is also an n-bit code word belonging to the same set of (n, k) block code.

A shortened cyclic code is obtained when (k−l) message bits are to be encoded using the (n, k) block code, where l<k.

It is noted that the present disclosure is explained using the shortened cyclic code as an example and similar explanation is applicable for other codes, for example linear block codes.

The receiver 100 includes an RDS unit 145 coupled to the FM demodulator 135. The RDS unit 145 receives the input multiplexed signal from the FM demodulator 140 and processes the input multiplexed signal. The RDS data after being processed by the RDS unit 145 can be displayed to a user of an electronic device including the receiver 100 to enhance user experience.

It is noted that present disclosure is explained using the RDS unit 145 as an example. Similar structure and functioning is applicable to an RBDS unit. It is also noted that the RDS unit 145 can be configured to operate as the RBDS unit and vice versa.

Figure 2:
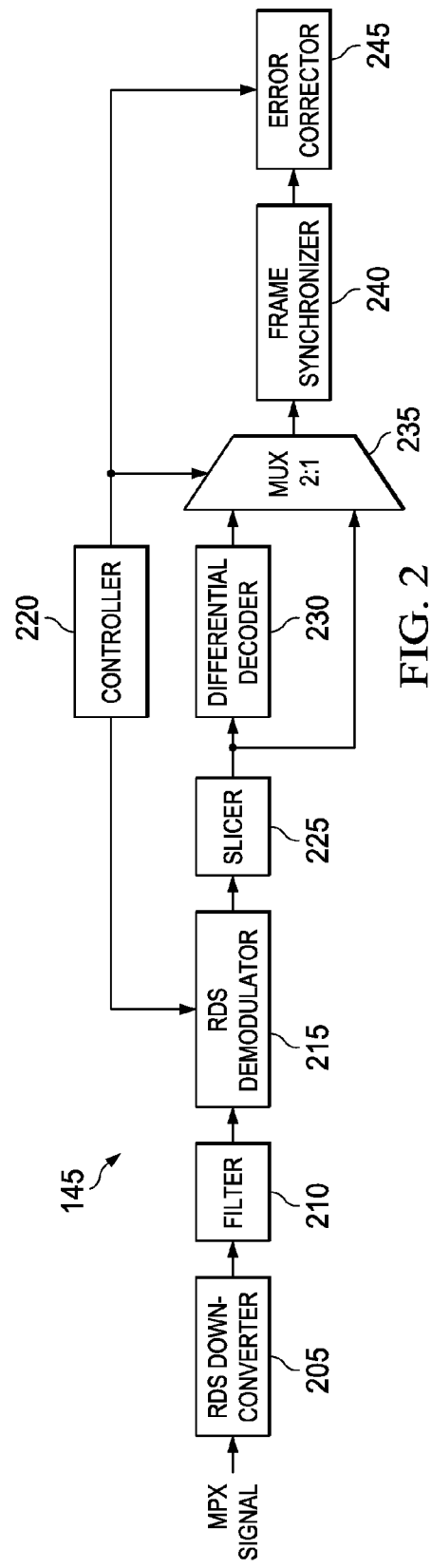
FIG. 2 illustrates a block diagram of a radio data system (RDS) unit, in accordance with one embodiment.

Referring to FIG. 2 now, the RDS unit 145 includes various elements for processing the input multiplexed signal. The RDS unit 145 includes an RDS down-converter 205 that receives and down converts the input multiplexed signal. The RDS down-converter 205 is coupled to a filter 210 that then filters the input multiplexed signal after down conversion. An RDS demodulator 215 is coupled to the filter 210. The RDS demodulator 215 is coupled to a controller 220. The RDS demodulator 215 is also coupled to or includes the slicer 225. The slicer 225 is coupled to a multiplexer 235. A differential decoder 230 is also present between the slicer 225 and the multiplexer 235. The multiplexer 235 is coupled to the controller 220 and a frame synchronizer 240. The frame synchronizer is coupled to an RDS error corrector 245, hereinafter referred to as the error corrector 245. The error corrector 245 is also coupled to the controller 220.

Examples of the controller 220 include, but are not limited to, a microcontroller and a hardware state machine.

It is noted that the input multiplexed signal processed by the RDS demodulator 215 can include the input multiplexed signal obtained after down conversion and filtering.

The RDS demodulator 215 can have two demodulators to perform a coherent demodulation and a differential demodulation of the input multiplexed signal, respectively. Various differential demodulators can be used for performing the differential demodulation. A coherent demodulator for performing the coherent demodulation is explained in detail in conjunction with FIG. 3. Based on a control signal from the controller 220 an output of the coherent demodulation or the differential demodulation can be selected as a demodulated signal and passed to a slicer 225. In some embodiments, the output of the differential demodulation is selected when the receiver 100 is activated, and then the output of the coherent demodulation can be selected. The controller 220 decides to select either the output of the coherent demodulation or the output of the coherent demodulation based on convergence of a phase locked loop (PLL), for example a second order PLL, present in the RDS demodulator 215. The PLL is described in conjunction with FIG. 3. The controller 220 can also decide to select the output of the coherent demodulation based on various other parameters, for example after lapse of a predefined time period from activation of the RDS unit 145. Further, the controller 220 can also decide to select the output of the coherent demodulation or the output of the differential demodulation by comparing error vector magnitude of the output of the differential demodulation with that of the output of the coherent demodulation, or by comparing block error rate obtained by use of the output of the differential demodulation with that obtained by use of the output of the coherent demodulation.

The error vector magnitude (EVM) can be computed or estimated by the controller 220 using various equations. For example, let x(k) be a complex number representing the output of a demodulator for $k^{th}$ symbol and s(k) be a complex number representation of estimated symbol for the $k^{th}$ instant. A term y(k) can be obtained by multiplying a complex conjugate of s(k) with the output x(k) of the demodulator, where x(k) represents the output on which effect of the estimated symbol is compensated.

$$y(k)=x(k)*s*(k)$$

The error vector magnitude can be estimated by computing variance of y(k) over a window of N symbols.

$$EVM = \frac{1}{N}\sum_{k=1}^{N}\left| y(k) - \frac{1}{N}\sum_{k=1}^{N} y(k) \right|^2$$

The output of the type of demodulation having lesser error vector magnitude can then be selected.

In one example, the block error rate can be computed by the controller 220 when the error corrector 245 receives both the output of the coherent demodulation and the output of the differential demodulation. The output of the type of demodulation corresponding to lesser block error rate can then be selected.

In some embodiments, the unit performing the differential demodulation can be inactivated after the PLL has converged.

In one embodiment, a multiplexer (not shown in FIG. 2) can be present between the RDS demodulator 215 and the slicer 225, and can be used to enable the selection. The output of the RDS demodulator 215 can also be referred to as a demodulated signal.

The slicer 225 quantizes the demodulated signal to generate bits. In some embodiments, when the output of the coherent demodulation is to be selected then the differential decoder 230 decodes the bits differentially. A switch can be used to selectively pass the bits from the slicer 225 to the differential decoder 230. The switch can be controlled using the controller 220.

It is noted that an output of the differential decoder 230 can include 0 or 1, output of the slicer 225 can either be represented as symbols +1 or −1 or can be represented as bits 0 or 1, and output of the RDS demodulator 215 can include real numbers which get quantized.

Number of bit errors in the bits at the output of the differential decoder 230 is mostly double of that at an input of the differential decoder 230. For example, a 1-bit error at the input results in 2-bit error at consecutive locations in the output. A 2-bit error at consecutive locations in the input results in 2-bit error at the output. A 2-bit error at non-consecutive locations in the input results in 4-bit error at the output.

The working of differential decoder 230 is now explained considering the output of the slicer 225 is represented as symbols. For example, to transmit 000 the symbols at the input of the differential decoder 230 should be +1+1+1 provided that initial beginning symbol was +1. The differential decoder 230 then differentially decodes +1+1+1 to yield 000. If the symbol is similar to a previous symbol then the output is 0 else the output is 1. Now, if there was an error in one symbol and the symbols at the input of the differential decoder 230 were −1+1+1 then the output will be 110. A 1-bit error (−1 instead of +1) in the input of the differential decoder 230 results in 2-bit error (110 instead of 000) in the output of the differential decoder 230.

The working of differential decoder 230 is now explained considering the output of the slicer 225 is represented as bits. For example, to transmit 000 the bits at the input of the differential decoder 230 should be 000 provided that initial beginning bit was 0. The differential decoder 230 then performs differential decoding by performing exclusive OR (XOR) operation of the bits to yield 000. Now, if there was an error in one bit and the bits at the input of the differential decoder 230 were 100 then the output will be 110. A 1-bit error (1 instead of 0) in the input of the differential decoder 230 results in 2-bit error (110 instead of 000) in the output of the differential decoder 230.

The multiplexer 235 then selects bits from the slicer 225 or the differential decoder 230 based on the control signal from the controller 220. The multiplexer 235 selects the bits from the slicer 225 when the output of the differential demodulation is to be selected and selects the bits from the differential decoder 230 when the output of the coherent demodulation is to be selected.

The frame synchronizer 240 groups the bits selected using the multiplexer 235 into one or more blocks. Each block includes 26 bits. The frame synchronizer 240 also identifies start of message bits and parity bits in each block thereby enabling accuracy in error correction by the error corrector 245.

The error corrector 245 computes a syndrome for a block received by the error corrector 245. For a (n, k) cyclic code, a generator polynomial of degree (n−k) can be given by:

$$g(x)=g_0+g_1x+g_2x^2+\ldots+g_{n-k}x^{n-k}$$

The syndrome S(x) for a received vector Z(x) can be determined by dividing Z(x) by g(x) as follows:

$$\frac{z(x)}{g(x)} = Q(x) + \frac{s(x)}{g(x)}$$

where Q(x) is a quotient polynomial.

The error corrector 245 identifies an error corresponding to the syndrome in the block based on the type of demodulation. Two syndrome tables including predefined syndromes can be present in the error corrector 245. One syndrome table corresponds to the differential demodulation and other syndrome table corresponds to the coherent demodulation. Each predefined syndrome can be a pattern of 10 bits and can be referred to as a syndrome pattern. Two error tables, one error table corresponding to the differential demodulation and other error table corresponding to the coherent demodulation can also be present. Each error table includes one predefined error corresponding to one predefined syndrome. Each predefined error includes a pattern of 26 bits and can be referred to as an error pattern.

The syndrome tables and the error tables can be computed offline and stored in the error corrector 245. In some embodiments, computation of predefined syndromes and predefined errors can be performed in real time, when the receiver 100 is operational.

The error corrector 245 matches the syndrome with the predefined syndromes based on the type of demodulation. If a match is found then a predefined error corresponding to a matching syndrome is identified as an error in the bits of the block. The error corrector 245 then corrects the error by performing XOR operation of the predefined error with message bits of the block.

If a match is not found then the bits of the syndrome are shifted by 1-bit to yield a shifted syndrome. The bits of the syndrome can be shifted by shifting bits in a syndrome computing unit. The shifted syndrome is then matched with the predefined syndromes. The shifting includes circulating the bits or rotating the bits in the syndrome computing unit. The shifting is performed till the match is found or till the block is determined to be uncorrectable, and next block is then processed.

Figure 3:
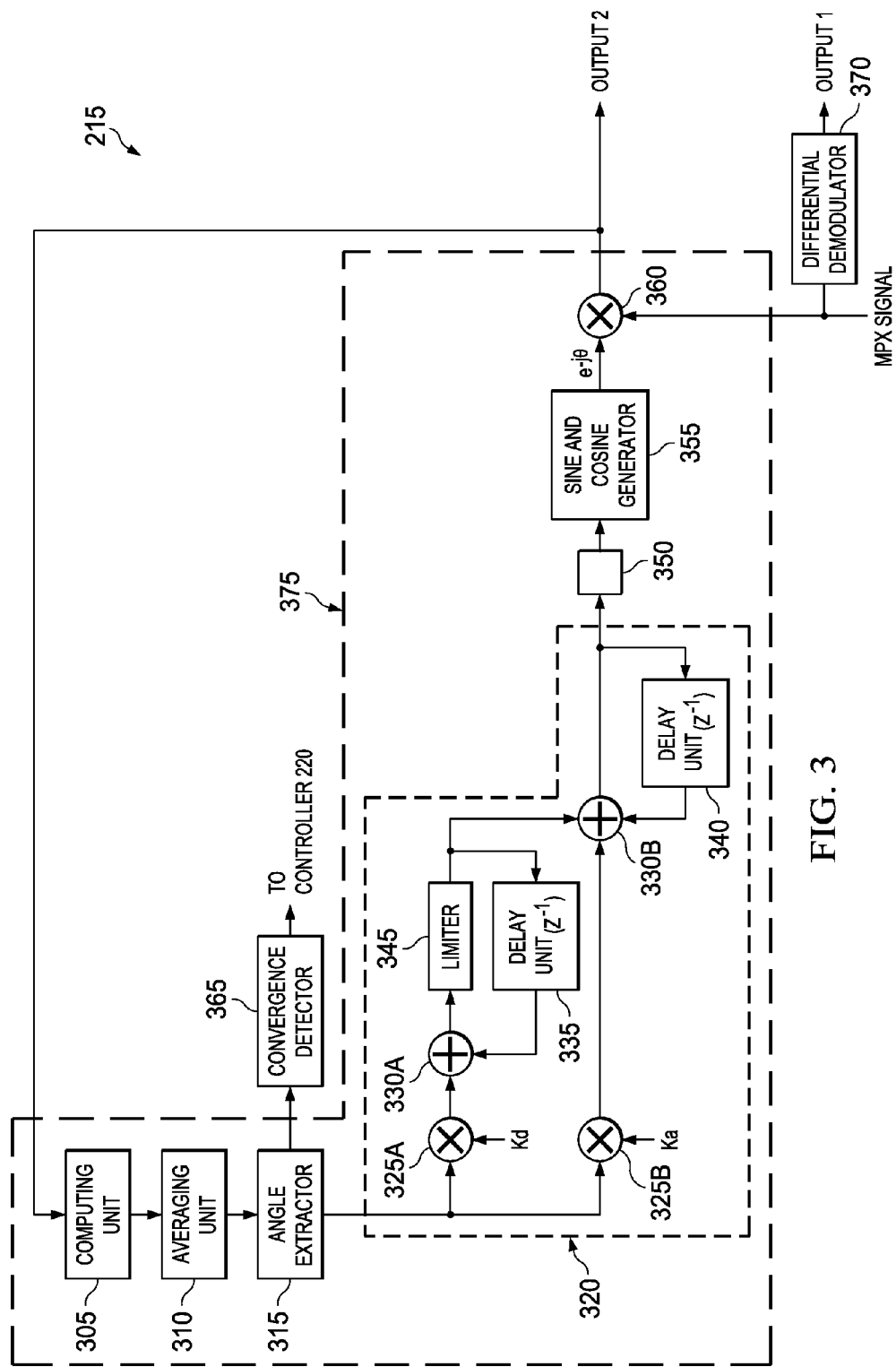
FIG. 3 illustrates a block diagram of an RDS demodulator of the RDS unit, in accordance with one embodiment.

Referring to FIG. 3 now, the RDS demodulator 215 is described. The RDS demodulator 215 includes a coherent demodulator 375 and a differential demodulator 370. The differential demodulator generates a differentially demodulated signal as an output (Output 1). The coherent demodulator generates a coherently demodulated signal as an output (Output 2).

The coherent demodulator 375 includes a computing unit 305 coupled to an averaging unit 310. The averaging unit is coupled an angle extractor 315 which in turn is coupled to a PLL 320. The PLL 320 is coupled to a unit 350, for example a multiplier or a divider. The unit 350 is coupled to a sine and cosine generator 355 which in turn is coupled to a multiplier 360. The angle extractor 315 is also coupled to a convergence detector 365.

It is noted that initially when the RDS demodulator 215 is activated, the output of the coherent demodulation is equal to the input multiplexed signal multiplied by $e^{-j\theta}$ where $\theta$ is equal to zero degrees.

The computing unit 305 computes a first signal from the output of the coherent demodulation. The first signal includes the output of the coherent demodulation raised to a power greater than one. In one embodiment, the computing unit 305 squares the output of the coherent demodulation in case the input multiplexed signal is binary phase shift keying (BPSK) modulated. In another embodiment, the computing unit 305 raises the power of the output of the coherent demodulation to four to generate the first signal in case the input multiplexed signal is quadrature phase shift keying (QPSK) modulated.

Squaring includes doubling angle of the output of the coherent demodulation and removing affect of BPSK modulation on the output of the coherent demodulation. Similarly, raising the power of the output of the coherent demodulation to four includes multiplying the angle of the output of the coherent demodulation with four and removing affect of QPSK modulation on the filtered signal. The averaging unit 310 then averages the first signal to minimize noise.

The computing unit 305 and the averaging unit 310 enables a blind carrier recovery of the filtered signal.

The angle extractor 315 extracts angle from the first signal or the output of the coherent demodulation in conjunction with the PLL 320. The angle can be referred to as an angle associated with the output of the coherent demodulation. The PLL 320 estimates a phase offset and a frequency offset in the first signal or the output of the coherent demodulation. Output of the angle extractor 315 can include for example 0, +/−π/4 and +1/−(3π)/4. The PLL 320 can be initially unconverged. The convergence detector 365 detects the unconvergence and indicates to the controller 220 to enable selection of the output of the differential demodulator 370 as the demodulated signal.

The convergence detector can be a hardware state machine of the RDS demodulator 215.

After initial convergence, the PLL 320 correctly estimates the phase offset and the frequency offset. The PLL 320 includes a plurality of multipliers, for example a multiplier 325A and a multiplier 325B; a plurality of summers, for example a summer 330A and a summer 330B; and plurality of delay units for example a delay unit 335 and a delay unit 340. The delay unit 340 in conjunction with the summer 330B acts as an integrator that outputs the angle by computing cumulative phase through integration.

In some embodiments, the PLL 320 includes a limiter 345 that clips range of estimated frequency offset. Clipping helps in ensuring that the PLL 320 does not perform a random walk and a drift of the PLL 320 is within a region of convergence of the PLL 320. For example, when an entity having the receiver 100 including the RDS unit 145 passes through a tunnel then strength of the signal varies. The strength of the signal can either be low or power of interference can be high making power of the signal comparatively low. Further, the clipping ensures that the PLL 320 converges to a correct value when the strength of the signal improves. For example, when the entity comes out of the tunnel then the strength of the signal becomes strong and since the PLL 320 has not drifted outside the region of convergence the PLL 320 converges to correct value.

Figure 4A:
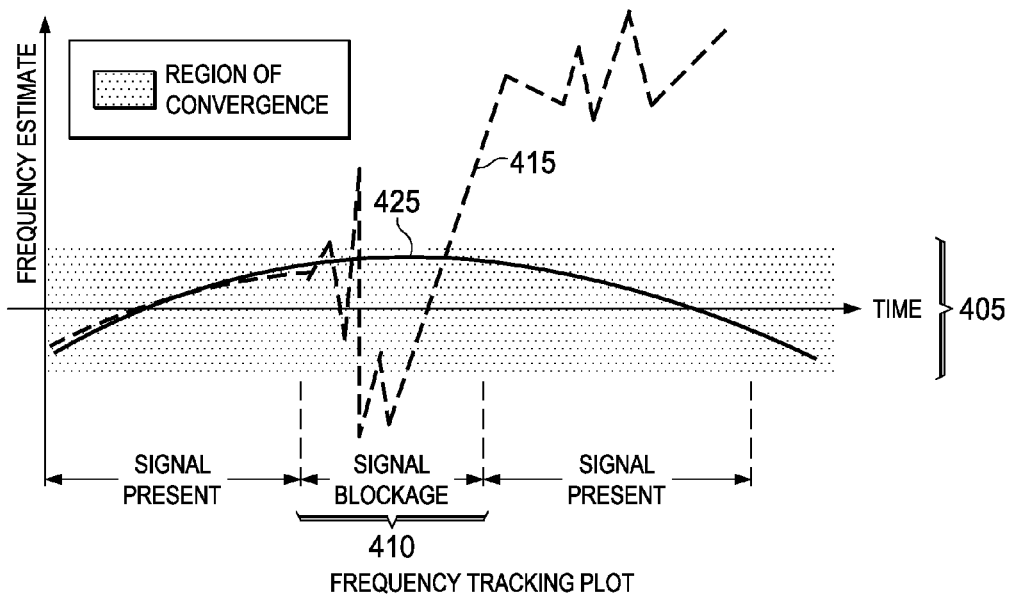
FIG. 4A and FIG. 4B illustrate an exemplary frequency plot without and with a limiter respectively, in accordance with one embodiment.
Figure 4B:
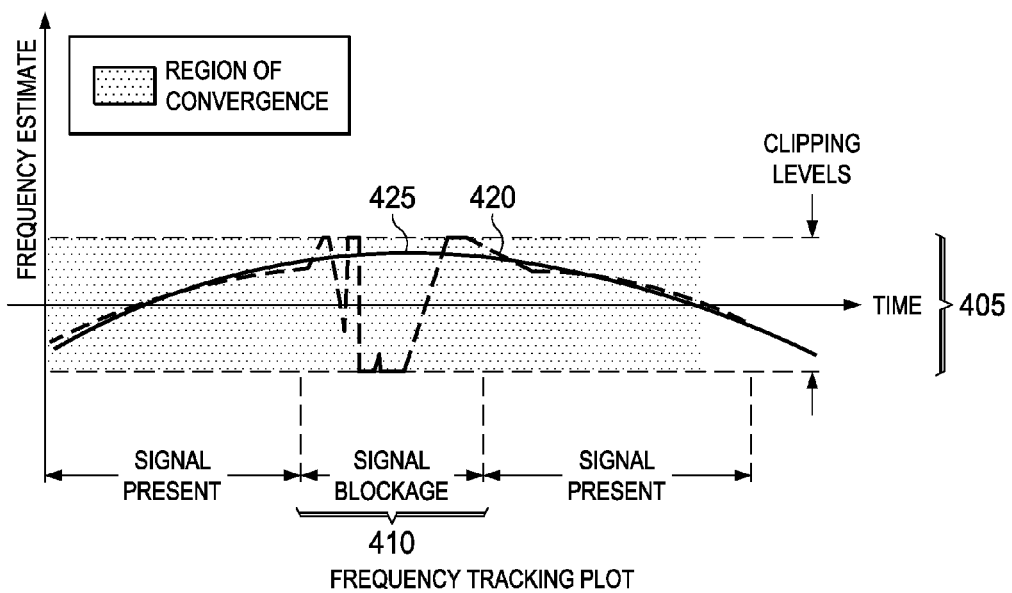

An exemplary frequency tracking plot without the limiter 345 is shown in FIG. 4A and an exemplary frequency tracking plot with the limiter 345 is shown in FIG. 4B. The frequency tracking plot is a plot of frequency estimate by the PLL 320 verses time. FIG. 4A indicates that the PLL 320 goes beyond region of convergence (405) as a waveform 415 corresponding to the frequency estimate of the PLL 320 goes beyond the region of convergence (405). FIG. 4B indicates that due to clipping the PLL 320 is within the region of convergence (405) as a waveform 420 corresponding to the frequency estimate of the PLL 320 does not go beyond the region of convergence (405) and converges with a waveform 425 corresponding to actual frequency variation. Time period 410 indicates blockage of the signal, for example when the receiver is in the tunnel.

The multiplier 325A corresponding to a gain Kd, the summer 330A and the delay unit 335 helps in estimating frequency offset in conjunction with other components of the PLL 320.

The multiplier 325B corresponding to a gain Ka and the summer 330B, and the delay unit 340 helps in estimating the phase offset in conjunction with other components of the loop 320.

The PLL 320 is coupled to the unit 350 that changes the magnitude of the angle by a predefined factor. For example, when the input multiplexed signal is BPSK modulated then the magnitude of the angle is halved by the unit 350 and when the input multiplexed signal is QPSK modulated then the magnitude of the angle is divided by four. A sine and cosine generator 355 then generates a complex number (($e^{-j\theta}$) corresponding to the angle having magnitude changed by the predefined factor.

In some embodiments, when the pilot carrier is present in the input multiplexed signal then the computing unit 305 and the averaging unit 310 can be bypassed and the angle is extracted from recovered pilot carrier, for example a pilot carrier at 19 KHz. The phase and the frequency offset are estimated using the PLL 320. The angle estimated from the PLL 320 is then multiplied by a factor of three by the unit 350 to obtain the angle multiplied by the factor of three.

The multiplier 360 then multiplies the input multiplexed signal with the complex number to generate the output of the coherent demodulation with residual phase offset equivalent to or close to zero. The residual phase offset can be defined as offset between expected angle and the angle extracted by the angle extractor 315.

The PLL 320 estimates the phase offset and the frequency offset, and thereby enables correction of at least one of the phase offset and the frequency offset in conjunction with other components, for example the multiplier 360.

A convergence detector 365 coupled to the angle extractor 315 indicates when the loop 320 converges. For example, when the angle extractor 315 gives an output of zero or close to zero then the PLL 320 is considered to be converged. In some embodiments, the output of the angle extractor 315 is averaged over a period of time and when average value is a value close to zero, the convergence detector 365 indicates that the PLL 320 has converged. The controller 220 then receives the indication from the convergence detector 365 that the PLL 320 is converged and activates selection of the output of the coherent demodulation as the demodulated signal.

In some embodiments, the output of the coherent demodulation can be selected as the demodulated signal based on other parameters also in conjunction with the convergence aspect. For example, after a lapse of the predefined time period from activation of the RDS unit 145 the controller 220 can decide to select the output of the coherent demodulation as the demodulated signal. The selection can also be decided by comparing the error vector magnitude of the output of the differential demodulation with that of the output of the coherent demodulation, or by comparing the block error rate obtained by use of the output of the differential demodulation with that obtained by use of the output of the coherent demodulation.

Figure 5:
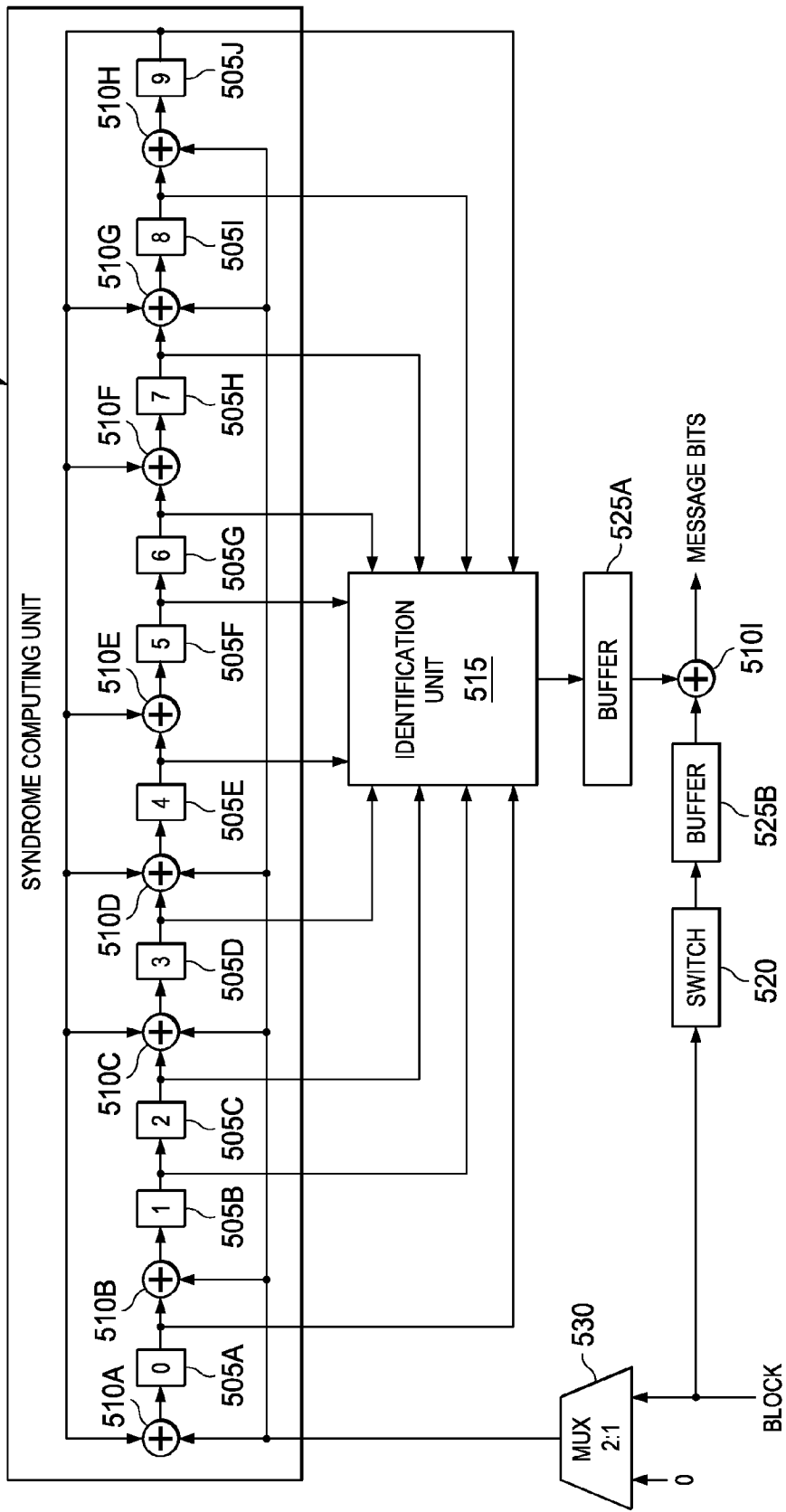
FIG. 5 illustrates an error corrector of the RDS unit, in accordance with one embodiment.

Referring to FIG. 5 now, the error corrector 245 is described. The error corrector 245 includes a multiplexer 530. One input of the multiplexer 530 is coupled to the frame synchronizer 240 and another input is coupled to a bit zero. Output of the multiplexer 530 is coupled to a syndrome computing unit 535. The syndrome computing unit 535 is also coupled to an identification unit 515. The identification unit 515 is coupled to a buffer 525A which in turn is coupled to an XOR gate 510I.

The switch 520 is coupled to the frame synchronizer 240. The switch 520 is also coupled to a buffer 525B which in turn is coupled to the XOR gate 510I.

The block of bits of the demodulated signal is received from the frame synchronizer 240. The bits can be passed to the syndrome computing unit 535, one by one, through the multiplexer 530. One bit can be received in one cycle. The block includes 26 bits. 26 bits includes 16 message bits followed by 10 parity bits. The switch 520 is closed for first 16 cycles to enable the buffer 525B to receive and store the 16 message bits. The switch 520 is then open for remaining 10 cycles.

The syndrome computing unit 535 includes a plurality of shift registers, for example a shift register 505A to a shift register 505J. The syndrome computing unit 535 also includes a plurality of XOR gates, for example an XOR gate 510A to an XOR gate 510H. The XOR gates are present corresponding to the plurality of shift registers based on the generator polynomial g(x). For example, if the generator polynomial g(x) is $1+x^3+x^4+x^5+x^7+x^8+x^9+x^{10}$, then the XOR gate 510A to the XOR gate 510H are present corresponding to the shift register 505A, the shift register 505B, the shift register 505D, the shift register 505E, the shift register 505F, the shift register 505H, the shift register 505I, and the shift register 505J.

Initially the shift registers are initialized to zero. As the bits are received by the syndrome computing unit 535, the syndrome computing unit 535 computes the syndrome S(x) by dividing the bits by the generator polynomial g(x) generated using the shift registers and the XOR gates. The syndrome can be calculated using the shift registers by shifting the 26 bits and XORing values in the shift registers. Once the 26 bits are shifted in the error corrector 245, the multiplexer 530 selects the bit zero until the processing of the block is finished to ensure that no bits of next block are received by the syndrome computing unit 535.

The syndrome is then compared with the predefined syndromes by the identification unit 515 based on the type of demodulation. The identification unit 515 stores the predefined syndromes and corresponding predefined errors for each type of demodulation. If a matching syndrome is determined then the error corresponding to the matching syndrome is identified. The 16 message bits stored in the buffer 525B are then XORed with bits from the buffer 525A, one by one, to correct the error and provide corrected message bits.

The identification unit 515 can be a hardware state machine. In some embodiments, some of the functionalities of the error corrector 245 can be performed using a firmware in conjunction with the microcontroller 220.

If no matching syndrome is determined, then the 10 bits in the shift registers of the syndrome computing unit 535 are circulated by 1 bit to yield a shifted syndrome. The shifted syndrome corresponds to the syndrome of the block shifted by 1 bit, or equivalently to the syndrome of the error shifted by 1 bit. During the circulation, the multiplexer 530 passes bit zero to the syndrome computing unit 535. The matching is then performed for the shifted syndrome and is repeated unless the error is determined and corrected or the block is determined to be uncorrectable.

Figure 6:
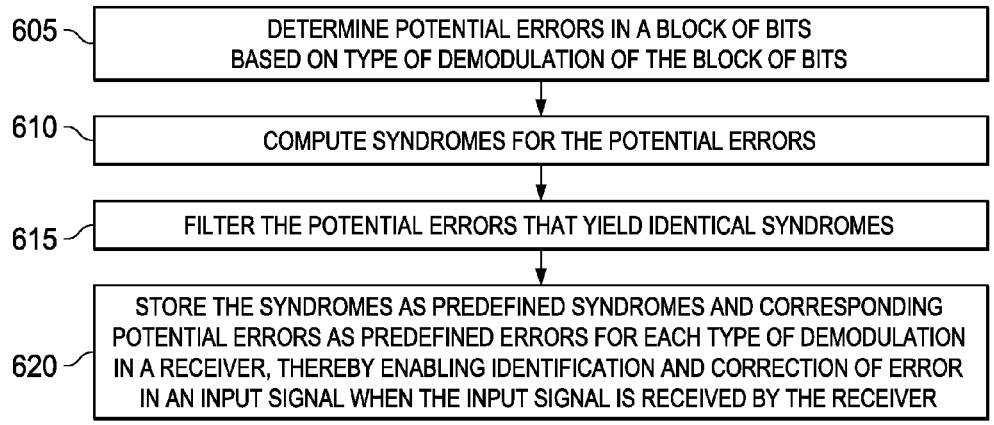
FIG. 6 illustrates a method for enabling error correction in a signal, in accordance with one embodiment.

Referring to FIG. 6 now, a method for enabling error correction in a signal by a receiver, for example the receiver 100 is described.

It is noted that the method described in FIG. 6 can be performed offline during design phase of the receiver. The method can be performed using a simulation tool or a machine learning technique or software logic in conjunction with a hardware processing unit, for example a computer and a digital signal processor.

In some embodiments, step 605 and step 610 can also be performed by the receiver when the receiver is operational.

At step 605, potential errors in a block of bits are determined based on type of demodulation of the block of bits. The type of demodulation includes the coherent demodulation and the differential demodulation. A potential error can be a pattern of 26 bits and can be referred to as an error pattern. The potential errors for the bits demodulated using coherent demodulation can be different from that for the bits demodulated using the differential demodulation. The potential errors can further be based on type of errors, for example a 1-bit error, a 2-bit error and so on. The number of type of errors occurring in the block can be determined based on knowledge of type of demodulation.

Figure 7:
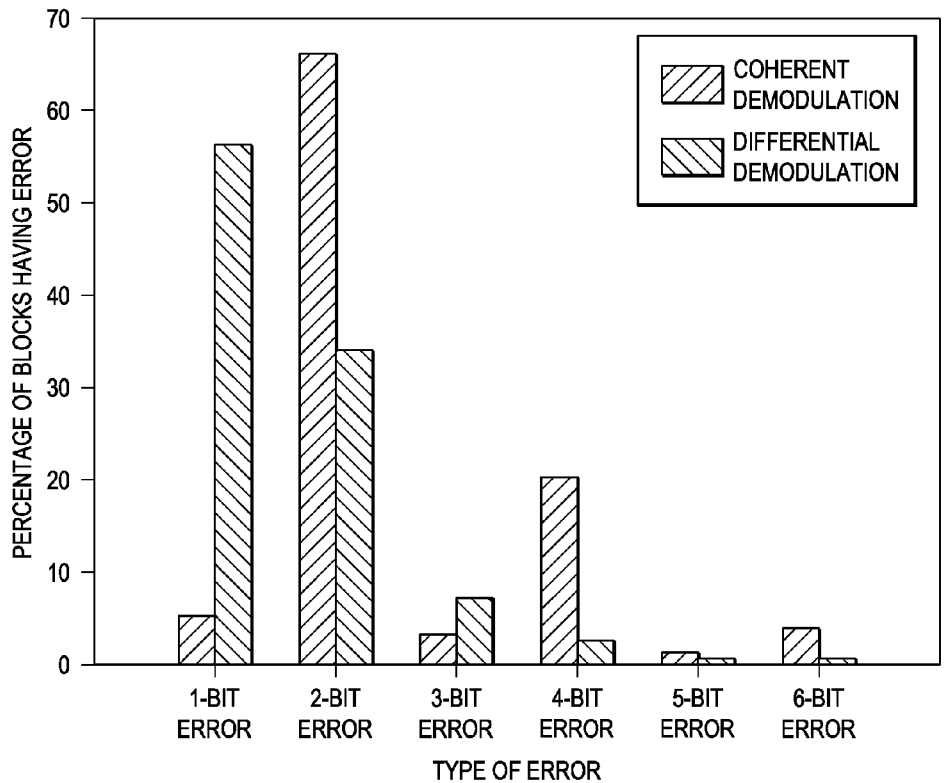
FIG. 7 illustrates a statistical representation of bit errors in a block of bits, in accordance with one embodiment.

The type of errors that can occur due to the coherent demodulation and the differential demodulation is illustrated in FIG. 7. X axis represents type of errors, for example 1-bit error, 2-bit error and so on that can occur in the block of bits provided to an error corrector, for example the error corrector 245, for the differential demodulation. X axis also represents type of errors, for example 1-bit error, 2-bit error and so on that can occur in the block of bits provided at the output of a differential decoder, for example the differential decoder 230, for the coherent demodulation. Y axis represents percentage of blocks having error. High percentage of blocks can have 2-bit errors when the bits are coherently demodulated while high percentage of blocks can have 1-bit error when the bits are differentially demodulated. The 1-bit errors or 3-bit errors can occur in case of the coherent demodulation due to grouping of the bits into blocks before the blocks are being provided to the error corrector. For example, if the 2-bit error occurs at an edge of the block then first error bit can be grouped in a first block and the second error bit can get grouped in a second block. The grouping of consecutive error bits in different groups can be referred to as an edge effect.

Other type of errors, for example 5-bit error, 6-bit error and so on can also occur. However, since such type of errors occur in number of blocks lesser than a predefined threshold such type of errors may or may not be considered based on need.

The potential errors can then be determined in the 26 bits based on knowledge of the type of demodulation and the type of error.

TABLE 1 illustrates exemplary potential errors for the coherent demodulation.

TABLE 1

| Error Number | Potential Error |
|---|---|
| 1 | 00000000000000000000000000 |
| 2 | 11000000000000000000000000 |
| 3 | 10100000000000000000000000 |
| 4 | 11110000000000000000000000 |
| 5 | 11011000000000000000000000 |
| 6 | 11001100000000000000000000 |
| 7 | 11000110000000000000000000 |
| 8 | 11000011000000000000000000 |
| 9 | 11000001100000000000000000 |
| 10 | 11000000110000000000000000 |
| 11 | 11000000011000000000000000 |
| 12 | 11000000001100000000000000 |
| 13 | 11000000000110000000000000 |
| 14 | 11000000000011000000000000 |
| 15 | 11000000000001100000000000 |
| 16 | 11000000000000110000000000 |
| 17 | 11000000000000011000000000 |
| 18 | 11000000000000001100000000 |
| 19 | 11000000000000000110000000 |
| 20 | 11000000000000000011000000 |
| 21 | 11000000000000000001100000 |
| 22 | 11000000000000000000110000 |
| 23 | 11000000000000000000011000 |
| 24 | 11000000000000000000001100 |
| 25 | 11000000000000000000000110 |
| 26 | 11000000000000000000000011 |
| 25 | 10000000000000000000000000 |
| 26 | 00000000000000000000000001 |

Error number 1 includes all zeroes indicating error free bits. Error number 2 correspond to the 2-bit error that can occur at the input of the error corrector or at the output of the differential decoder. Error number 3 corresponds to a 2-bit error at input of the differential decoder that occurs at consecutive locations and hence also results in a 2-bit error at the output of the differential decoder or at the input of the error corrector. Error numbers 4 to 24 correspond to 4-bit errors that can occur at the input of the error corrector. Error numbers 25 and 26 correspond to errors occurring due to the edge effect.

TABLE 2 illustrates exemplary potential errors for the differential demodulation.

| Error Number | Potential Error |
|---|---|
| 1 | 00000000000000000000000000 |
| 2 | 10000000000000000000000000 |
| 3 | 11000000000000000000000000 |
| 4 | 10100000000000000000000000 |
| 5 | 10010000000000000000000000 |
| 6 | 10001000000000000000000000 |
| 7 | 10000100000000000000000000 |
| 8 | 10000010000000000000000000 |
| 9 | 10000001000000000000000000 |
| 10 | 10000000100000000000000000 |
| 11 | 10000000010000000000000000 |
| 12 | 10000000001000000000000000 |
| 13 | 10000000000100000000000000 |
| 14 | 10000000000010000000000000 |
| 15 | 10000000000001000000000000 |
| 16 | 10000000000000100000000000 |
| 17 | 10000000000000010000000000 |
| 18 | 10000000000000001000000000 |
| 19 | 10000000000000000100000000 |
| 20 | 10000000000000000010000000 |
| 21 | 10000000000000000001000000 |
| 22 | 10000000000000000000100000 |
| 23 | 10000000000000000000010000 |
| 24 | 10000000000000000000001000 |
| 25 | 10000000000000000000000100 |
| 26 | 10000000000000000000000010 |
| 27 | 10000000000000000000000001 |

Error number 1 includes all zeroes indicating error free bits. Error number 2 corresponds to a 1-bit error. Error numbers 3 to 25 correspond to 2-bit errors that can occur at the input of the error corrector.

At step 610, syndromes are computed for the potential errors. The syndromes are computed as explained below.

For the (n, k) cyclic code, there exists the generator polynomial of degree (n-k) given by:

$$g(x) = g_0 + g_1 x + g_2 x^2 + \ldots + g_{n-k} x^{n-k}$$

The generator polynomial g(x) of the (n, k) cyclic code can be a factor of $x^n + 1 x^n + 1 = g(x) * H(x)$
where H(x) is another polynomial of degree k called parity check polynomial.

To generate the cyclic code a remainder polynomial R(x) is obtained from division of $x^{m-k} * D(x)$ by g(x). D(x) is a message vector polynomial of degree k. Coefficients of R(x) are placed in beginning followed by coefficients of the message vector polynomial D(x) to get a code vector C(x). C(x) can be expressed as: $C(x) = x^{n-k} D(x) + R(x)$ Let $C(x) = (c_1, c_2, c_n)$ be a valid code vector transmitted over a noisy communication channel belonging to the (n, k) linear block code. $c_1, c_2, \ldots, c_n$ are coefficients of a code vector polynomial and can be used to represent the code vector. Let $Z(x) = (z_1, z_2, \ldots, z_n)$ be a received vector. $z_1, z_2, \ldots, z_n$ are coefficients of the received vector and can be used to represent the received vector. Due to noise in the channel $z_1, z_2, \ldots, z_n$ may be different from $c_1, c_2, \ldots, c_n$. The error vector or the error E(x) is the difference between Z(x) and C(x).

$E(x) = Z(x) - C(x)$ (subtraction is the same as addition in modulo 2 arithmetic).

$E(x) = (e_1, e_2, \ldots, e_n)$, where $e_1, e_2, \ldots, e_n$ are coefficients of the error vector and can be used to represent the error vector.

The receiver, when operational, can receive Z(x) and is unaware of C(x) and E(x). In order to find E(x) and C(x), an (n-k) vector S(x) can be computed. The vector S(x) can be defined as $$S(x) = (s_1, s_2, \ldots, s_{n-k}) = Z(x)/g(x)$$

The vector S(x) is called the syndrome or the syndrome vector of Z(x).

$$S(x) = Z(x)/g(x) = (C(x) + E(x))/g(x) = C(x)/g(x) + E(x)/g(x) = E(x)/g(x) \text{ where } (C(x)/g(x) = 0)$$

Thus, the syndrome depends only on the error and not the message. The syndrome vector is zero if Z(x) is a valid code vector. When $Z(x) \ne C(x)$ and E(x) is not one of the code vectors then $S(x) \ne 0$.

The syndrome S(x) of Z(x) is the remainder resulting from dividing Z(x) by g(x).

$$\frac{Z(x)}{g(x)} = Q(x) + \frac{S(x)}{g(x)}$$

where Q(x) is the quotient polynomial.

The syndrome S(x) is a polynomial of degree n−k−1 or less.

$$Z(x) = C(x) + E(x).$$

$$\frac{z(x)}{g(x)} = \frac{c(x)}{g(x)} + \frac{E(x)}{g(x)}$$

$$C(x) = D(x) * g(x).$$

$$\frac{z(x)}{g(x)} = D(x) + \frac{E(x)}{g(x)}$$

$$D(x) + \frac{E(x)}{g(x)} = Q(x) + \frac{S(x)}{g(x)}$$

$$\frac{E(x)}{g(x)} = Q(x) + D(x) + \frac{s(x)}{g(x)}$$

$$E(x) = g(x)[Q(x) + D(x)] + S(x)$$

Above-mentioned equations indicate that the syndrome of Z(x) is equal to the remainder resulting from dividing the error by the generator polynomial. The syndrome includes information about the error that can be used for error correction.

It is noted that Table 1 and Table 2 illustrates exemplary potential errors and not an exhaustive list.

At step 615, the potential errors that yield identical syndromes are filtered. An identical syndrome can be obtained from a plurality of potential errors. For example, a syndrome corresponding to a first potential error can be identical to that corresponding to a second potential error. In such cases, a potential error having highest probability of occurrence among the potential errors yielding the identical syndrome is stored as the potential error corresponding to the identical syndrome. The potential error corresponding to the identical syndrome can then be referred to as a predefined error. In one example, the probability of occurrence can be determined based on the type of demodulation and the type of error using the statistical representation shown in FIG. 7. For example, in case of coherent demodulation if the first potential error is a 1-bit error and the second potential error is a 2-bit error, and the 2-bit error occurs greater number of times as shown in FIG. 7 then the potential error corresponding to the 2-bit error is stored.

At step 620, the syndromes are stored along with the corresponding potential errors for the coherent demodulation and the differential demodulation. The syndromes are stored and referred to as predefined syndromes. The potential errors corresponding to the predefined syndromes are also stored and referred to as the predefined errors.

Storing a predefined syndrome can be defined as storing of 10 bit pattern and storing a predefined error can be defined as storing 26 bit pattern. Before the storing of the syndromes as the predefined syndromes and of the corresponding potential errors as the predefined errors, the syndromes and the corresponding potential errors can be optimized based on cyclic property of the syndromes and the corresponding potential errors. For example, a first syndrome 0000001100 can be computed for a first potential error 00110000000000000000000000. If the bits of the first potential error are rotated by 1-bit then the first syndrome also gets rotated (shifted cyclically) by 1-bit. Hence, by storing one syndrome (the first syndrome) and one corresponding potential error (the first potential error), all potential errors and syndromes that can be obtained by rotating the first potential error are covered.

It is noted the TABLE 1 and TABLE 2 illustrates the predefined errors.

TABLE 3 illustrates the predefined syndromes stored for the predefined errors mentioned in TABLE 1. One predefined syndrome corresponds to one predefined error. For example, Syndrome number 1 in TABLE 3 corresponds to Error number 1 in TABLE 1.

TABLE 3

| Syndrome Number | Predefined Syndrome |
| --- | --- |
| 1 | 0000000000 |
| 2 | 0000000011 |
| 3 | 0000000101 |
| 4 | 0000001111 |
| 5 | 0000011011 |
| 6 | 0000110011 |
| 7 | 0001100011 |
| 8 | 0011000011 |
| 9 | 0110000011 |
| 10 | 1100000011 |
| 11 | 0100110100 |
| 12 | 1001101101 |
| 13 | 0000110010 |
| 14 | 0001100001 |
| 15 | 0011001111 |
| 16 | 0110001011 |
| 17 | 1100010011 |
| 18 | 1011001110 |
| 19 | 0101110100 |
| 20 | 0100110010 |
| 21 | 1001100001 |
| 22 | 0000101010 |
| 23 | 0001010001 |
| 24 | 0010100111 |
| 25 | 0000000001 |
| 26 | 1101100011 |

TABLE 4 illustrates the predefined syndromes stored for the predefined errors mentioned in TABLE 2. One predefined syndrome corresponds to one predefined error. For example, Syndrome number 1 in TABLE 4 corresponds to Error number 1 in TABLE 2.

TABLE 4

| Syndrome Number | Predefined Syndrome |
| --- | --- |
| 1 | 0000000000 |
| 2 | 0000000001 |
| 3 | 0000000011 |
| 4 | 0000000101 |
| 5 | 0000001001 |
| 6 | 0000010001 |

TABLE 4-continued

| Syndrome Number | Predefined Syndrome |
|---|---|
| 7 | 0000100001 |
| 8 | 0001000001 |
| 9 | 0010000001 |
| 10 | 0100000001 |
| 11 | 0011101100 |
| 12 | 0111011011 |
| 13 | 1110110101 |
| 14 | 1110000100 |
| 15 | 1111100110 |
| 16 | 1100100010 |
| 17 | 1010101010 |
| 18 | 0110111010 |
| 19 | 1101110111 |
| 20 | 0011101110 |
| 21 | 0111011111 |
| 22 | 1110111101 |
| 23 | 1110010100 |
| 24 | 1111000110 |
| 25 | 1101100010 |

The storing can be performed during designing of the receiver. The storing of the predefined syndromes and the predefined errors enables identification and correction of errors in an input signal received by the receiver when the receiver is operational.

Figure 8:
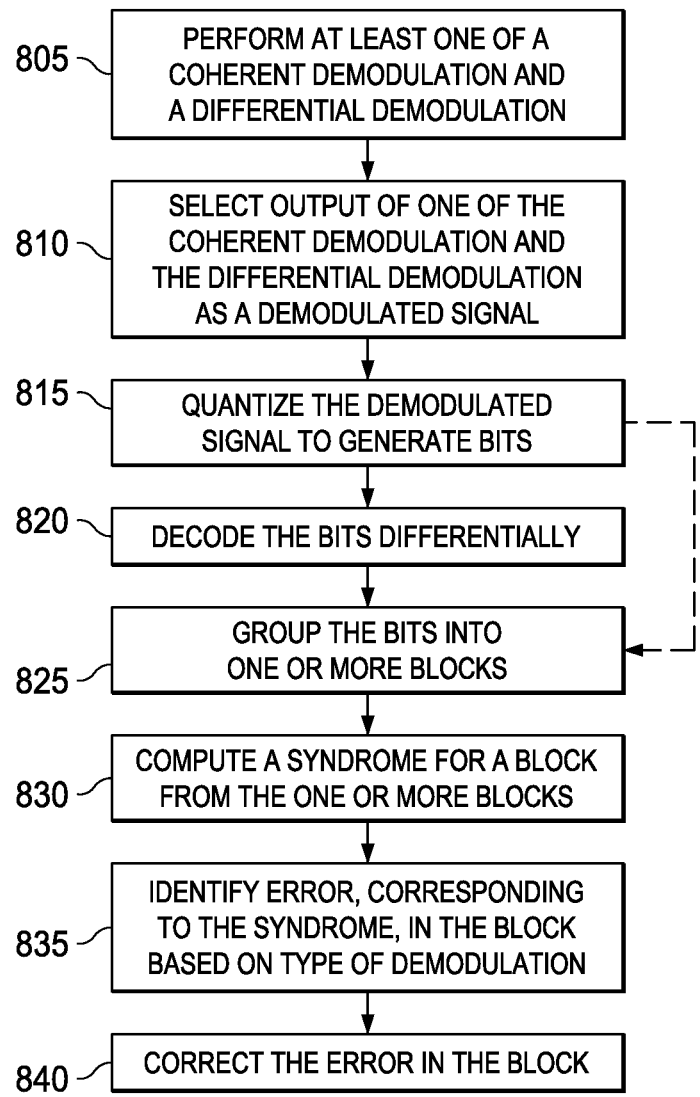
FIG. 8 illustrates a method for processing a signal in a receiver, in accordance with one embodiment.

FIG. 8 illustrates a method for processing a signal, for example the signal having the RDS data, in a receiver, for example the receiver 100. The signal can be processed by other components of the receiver before the signal is passed to an RDS unit, for example the RDS unit 145. The signal received by the RDS unit can be referred to as the input multiplexed signal.

At step 805, at least one of the coherent demodulation and the differential demodulation of the input multiplexed signal is performed. The input multiplexed signal can be down-converted and filtered before the demodulation.

In some embodiments, both the coherent demodulation and the differential demodulation are performed until a PLL, for example the PLL 320, of the RDS unit is converged.

The coherent demodulation includes estimating the phase offset and the frequency offset of the input multiplexed signal and correcting at least one of the phase offset and the frequency offset. The phase offset can be there due to difference in start of carriers at a transmitter and the receiver. The frequency offset can be there due to difference in crystal oscillators used in the transmitter and the receiver.

In one embodiment, the coherent demodulation is performed using blind phase recovery. If the input multiplexed signal is modulated using the BPSK technique then an output of the coherent demodulation is squared to double the angle and remove effect of modulation.

Initially when the receiver is activated, the output of the coherent demodulation includes the input multiplexed signal multiplied by $e^{-j\theta}$ where $\theta$ is zero degrees. The output of the coherent demodulation obtained after squaring can be referred to as a squared signal. The squared signal can then be averaged to remove noise. An angle is then extracted. The angle extraction includes estimating an angle and quantizing the angle to 0, +/−π/4 and +/−(3π)/4. The angle is then averaged and provided as input to the PLL. The angle is estimated based on sign of bits of real and imaginary components of the squared signal. The PLL estimates the phase offset and the frequency offset, and hence enables correction of the phase offset and the frequency offset.

In some embodiments, range of estimation of the frequency offset can be clipped to ensure that the PLL does not go out of the region of convergence. For example, when an entity including the receiver passes through a tunnel power of the signal varies. The PLL might drift when the power of the signal is low in the tunnel or due to domination of noise and may not be able to converge when the power of the signal increases after the tunnel is crossed. The clipping prevents the PLL from drifting beyond a certain limit. The PLL includes a limiter, for example the limiter 345 to clip the range of the estimation.

The angle is then halved and the input multiplexed signal is then multiplied by the complex number corresponding to the half magnitude of the angle to yield the output. The output includes coherently demodulated signal.

It is noted that the coherent demodulation can be performed for the signals that are modulated using various modulation techniques. For example, if the input multiplexed signal is modulated using the QPSK technique then a first signal having the output of the coherent demodulation raised to the power of 4 can be computed. The angle can then be extracted and the input multiplexed signal can be multiplied by the complex number corresponding to ¼ magnitude of the angle to yield the demodulated signal. In generic aspect, the first signal having the output of the coherent demodulation raised to a power greater than 1 can be computed. The angle can be extracted from the first signal. The angle can then be multiplied by a predefined factor. The input multiplexed signal can then be multiplied with the complex number corresponding to the angle multiplied by the predefined factor to yield the coherently demodulated signal.

In another embodiment, the coherent demodulation is performed using pilot phase recovery. An angle is extracted from recovered pilot carrier, for example a pilot carrier at 19 KHz. The phase and the frequency offset are estimated using the PLL. The angle estimated from the PLL is then multiplied by a factor of three to obtain the angle multiplied by the factor of three. The input multiplexed signal is then multiplied by the complex number corresponding to the angle multiplied by the factor of three to yield the output of the coherent demodulation.

The differential demodulation of the input multiplexed signal can be performed with various differential demodulation techniques, for example a technique described in Page 274-275, in section 5-2-7 titled "*Differential PSK (DPSK) and its Performance*" of book titled, "*Digital Communication*" by John G Proakis, Third Edition, Mc Graw Hill Publication published in 1995.

At step 810, the output of the coherent demodulation or output of the differential demodulation is selected.

In some embodiments, the output of the differential demodulation is selected as the demodulated signal before initial convergence of the PLL and the output of the coherent demodulation is selected as the demodulated signal after convergence of the PLL. Selected output is referred to as the demodulated signal. The output of the coherent demodulation can also be selected based on other parameters, for example upon lapse of a predefined time period from activation of the receiver.

At step 815, the demodulated signal is quantized to generate bits. The quantization includes converting real numbers into whole numbers. The quantization can be performed, for example, by using the slicer 225 in response to receipt of the demodulated signal by the slicer 225. The bits that are generated can also be referred to as symbols and can be represented as +1 and −1 or can be represented as 0 and 1.

If the output of the differential demodulation is selected then step 825 is processed next and step 820 is bypassed. If the output of the coherent demodulation is selected then step 820 is processed.

At step 820, the bits are decoded differentially. The bits can be decoded differentially, for example, by using the differential decoder 230. Output of differential decoding includes 0 or 1. The bit error present in the bits before the differential decoding doubles after the differential decoding in most of the cases. For example, 1-bit error before differential decoding becomes 2-bit error after differential decoding and 2-bit error before differential decoding becomes 4-bit error after differential decoding. However, when the 2-bit error before differential decoding occurs at consecutive locations then 2-bit error occurs after differential decoding.

At step 825, the bits are grouped into one or more blocks. Grouping can also be referred to as frame synchronization and can be performed using a frame synchronizer, for example the frame synchronizer 240. Each block includes 26 bits corresponding to (26, 16) shortened cyclic code. 26 represents total number of bits and 16 represents message bits. Remaining 10 (26-16) bits are parity bits.

It is noted that due to frame synchronization, the 4-bit error after differential decoding may actually result in a 3-bit error in a first block as 3 error bits gets grouped in the first block and fourth error bit can get grouped into a second block. Similarly, the 2-bit error after differential decoding may result in a 1-bit error based on grouping. Effect of such grouping can be referred to as the edge effect.

At step 830, a syndrome is computed for a block. The syndrome can be computed by using shift registers and XOR based approach, for example by using the syndrome computing unit 535.

At step 835, the error corresponding to the syndrome is identified in the block, based on the type of demodulation.

In some embodiments, the predefined errors are determined based on type of demodulation and can be stored in the receiver. Predefined syndromes corresponding to each predefined error are also determined and stored. The predefined syndromes and corresponding predefined errors are illustrated in TABLE 1, TABLE 2, TABLE 3, and TABLE 4. The predefined syndromes can be retrieved. The syndrome is then matched with the predefined syndromes. If the syndrome matches a first predefined syndrome of the predefined syndromes then the first predefined error corresponding to the first predefined syndrome is identified as the error corresponding to the syndrome and step 840 is performed. The first predefined syndrome can be referred to as the matching syndrome.

In one embodiment, if the syndrome does not match any of the predefined syndromes then the bits in the shift registers are shifted by 1-bit to yield the bits shifted by 1-bit. The bits in the shift registers after shifting by 1-bit can be referred to as a shifted syndrome. Further, the shifting is cyclic and input bits of next block are not received while the shifted syndrome is being computed. Cyclic shifting can also be referred to as rotation. The shifted syndrome is then matched with the stored syndromes. The shifting and matching is performed till a match is found or the bits of the block are determined as uncorrectable.

In some embodiments, the identification can be performed when the receiver is operational. The determining of the potential errors and corresponding syndromes can be performed when the receiver is operational. The matching can then be performed.

At step 840, the error corresponding to the syndrome is corrected through XOR operation between the message bits of the block and the predefined error.

An exemplary algorithm for performing step 825 to step 840, for example by using the error corrector 245, is now provided.

Step 0: Group received bit sequence into a block of 26 bits. Use frame synchronization to determine first bit of the block.

Step 1: Error pattern register=All zeroes; Syndrome registers (for example the shift register 505A to the shift register 505J)=All zeroes; Error Determination Flag=1; Syndrome Count=0

The error determination flag and the syndrome count can be maintained by a hardware state machine, for example the identification unit 515. The error pattern register can be maintained by the identification unit 515 and can be present in an error pattern buffer, for example the buffer 525A.

Step 2: Compute 10-bit syndrome using the 26 bits of the block and buffer 16 message bits of the block in a message buffer, for example the buffer 525B.

Step 3: Compare syndrome with the predefined syndromes corresponding to the predefined errors. If syndrome count=0 and the type of demodulation is the coherent demodulation then use all 26 predefined syndromes for comparing, else use first 24 predefined syndromes for comparing. If syndrome count=0 and the type of demodulation is the differential demodulation then use all 25 predefined syndromes for comparing. If a match occurs then copy the predefined error corresponding to the matching syndrome in the error pattern register. Set Error Determination Flag=0 and Go To Step 4. If the match does not occur and syndrome count<26, Go To Step 5. Else Go To Step 6.

Step 4: XOR the 16 message bits from the message buffer, one bit at a time, with a corresponding bit from the error pattern buffer. When the 16 message bits are XORed, Go To Step 6.

Step 5: Circulate the bits in the syndrome registers by 1-bit and increment Syndrome Count by 1. If the message buffer is not empty then shift out one bit from the message buffer. XOR output of the error pattern register (0 due to absence of an identifiable error) with bit from the message buffer. Go To Step 3.

Step 6: The error correction process is complete, if an error has been detected. Else, the error is uncorrectable. Go To Step 0 and start processing bits of next block.

Step 825 to step 840 is also explained with help of an example now. In illustrated example, if the error at the input of the error corrector, for the block of 26 bits, happens to be 00110000000000000000000000, the left most bit being the first received bit, then the syndrome can be computed as 0000001100. The syndrome does not match any predefined syndrome of TABLE 3. The bits in the syndrome computing unit are rotated by 1-bit. The rotation of the contents of the syndrome registers is equivalent to performing $x*E(x)/g(x)$. Rotated syndrome (the shifted syndrome) is then computed as 00000110. The rotated syndrome also does not match any predefined syndrome of TABLE 3. The bits in the syndrome computing unit are then again rotated by 1-bit. The rotated syndrome is then computed as 00000011. The rotated syndrome matches syndrome number 2 in TABLE 3. The error number 2 (11000000000000000000000000) in TABLE 1 is identified as the error corresponding to the syndrome 00000011. The error is then considered as a correctable error and corrected. The error correction is performed using an XOR operation of the bits in the error pattern buffer with the message bits in the message buffer. The first 2 received bits from the message buffer would have already been shifted out, prior to the error correction with the identified error. This ensures that the error in the received bits (0011000000000000000000000) is equivalently corrected.

Around 91% of 4-bit errors and 100% of 2-bit errors at the input of the error corrector 245 can be corrected when the error corrector 245 is used in conjunction with the coherent demodulator and the differential decoder.

The demodulation performed at step 805 and the error correction performed using step 825 to step 840 help improve performance of the receiver by around 2 decibels (dB).

Figure 9:
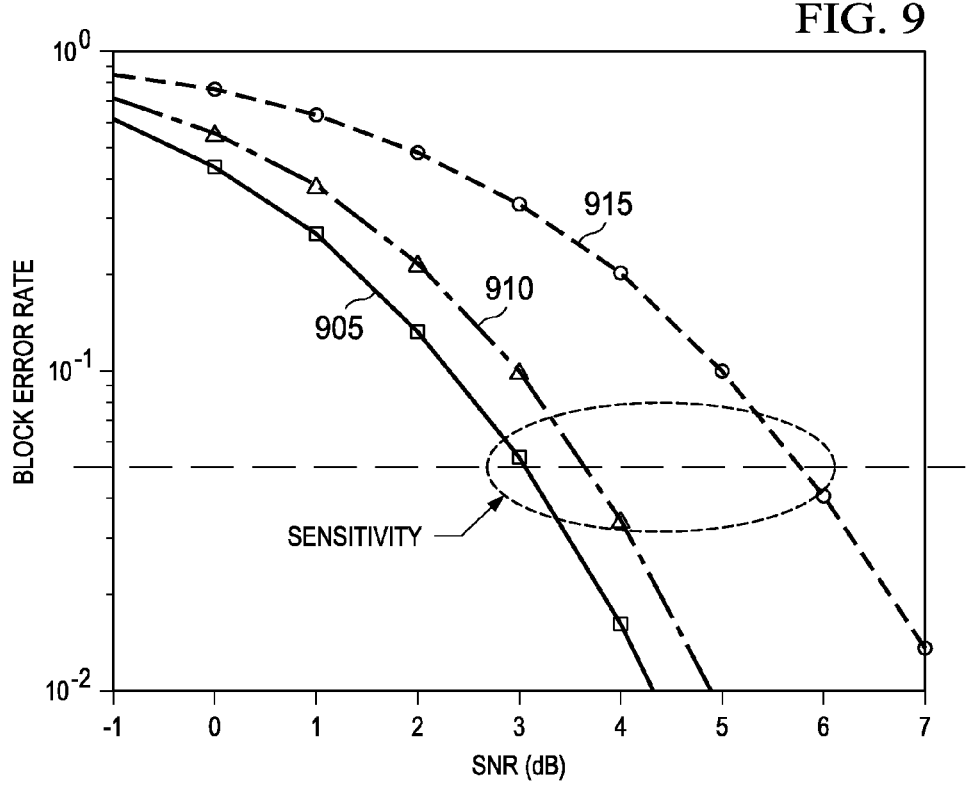
FIG. 9 illustrates a graphical representation of performance of the error corrector of the RDS unit, in accordance with one embodiment.

FIG. 9 illustrates performance of an RDS decoder, for example the RDS decoder 220. A waveform 905 corresponds to the error corrector 245 performing the error correction. A waveform 910 corresponds to burst error correction technique (prior art) and a waveform 915 corresponds to block error rate without any error correction.

X-axis represents signal-to-noise ratio (SNR) in dB and Y-axis represents block error rate. The waveform 905 has lower SNR as compared to the waveform 910 and the waveform 915 for same performance or sensitivity indicating around 0.65 dB gain compared to the burst error correction technique (prior art).

Figure 10:
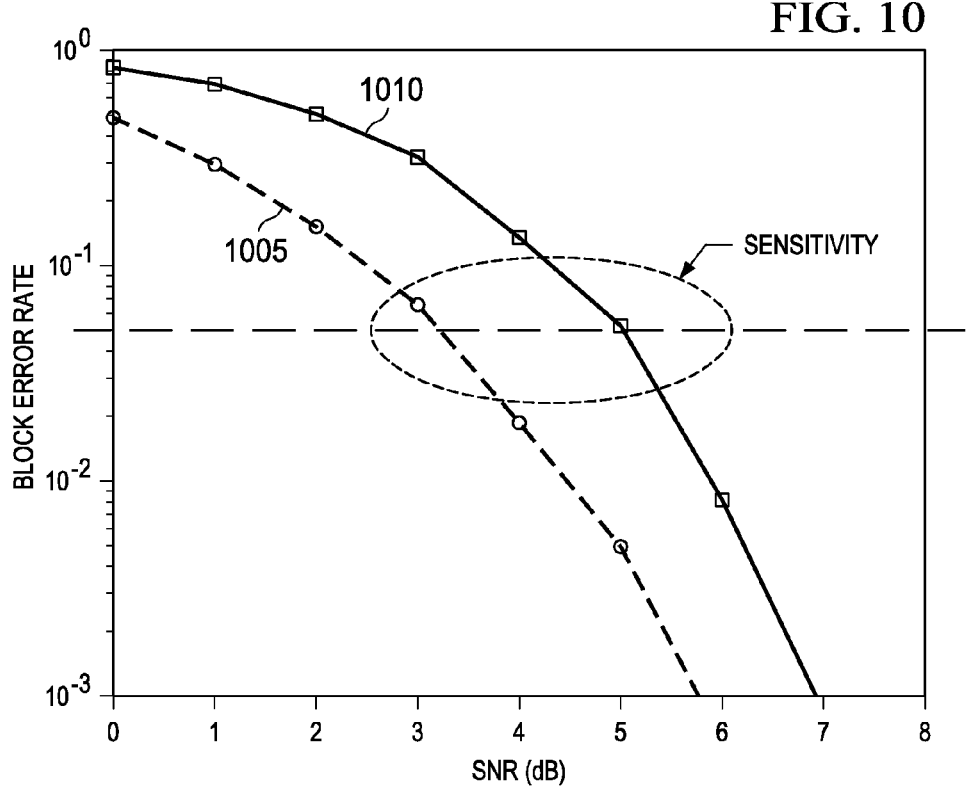
FIG. 10 illustrates a graphical representation of performance of the RDS unit, in accordance with one embodiment.

FIG. 10 illustrates performance of the RDS unit 145. A waveform 1005 corresponds to the RDS unit 145 performing the coherent demodulation followed by the error correction. A waveform 1010 corresponds to differential demodulation technique along with burst error correction technique (prior art).

X-axis represents SNR in dB and Y-axis represents block error rate. The waveform 1005 has lower SNR as compared to the waveform 1010 for same performance or sensitivity indicating around 2 dB gain compared to the differential demodulation technique and the burst error correction technique (prior art).

In the foregoing discussion, the term "coupled or connected" refers to either a direct electrical connection between the devices connected or an indirect connection through one or more passive or active intermediary devices. The term "signal" means data, or other signal.

The foregoing description sets forth numerous specific details to convey a thorough understanding of embodiments of the disclosure. However, it will be apparent to one skilled in the art that embodiments of the disclosure may be practiced without these specific details. Some well-known features are not described in detail in order to avoid obscuring the disclosure. Other variations and embodiments are possible in light of above teachings, and it is thus intended that the scope of disclosure not be limited by this Detailed Description, but only by the Claims.

What is claimed is:

1. A method for processing a signal in a receiver, the method comprising:
   quantizing a demodulated signal to generate bits in response to receipt of the demodulated signal;
   grouping the bits into one or more blocks;
   computing a syndrome for a block from the one or more blocks;
   identifying error, corresponding to the syndrome, in the block based on type of demodulation of the demodulated signal, the type of demodulation including a coherent demodulation and a differential demodulation, the identifying the error including:
   matching the syndrome with predefined syndromes;
   identifying a predefined error, corresponding to a matching syndrome, from predefined errors as the error;
   shifting bits of the syndrome by 1 bit to yield a shifted syndrome if the syndrome does not match the predefined syndromes; and
   matching the shifted syndrome with the predefined syndromes; and
   correcting the error in the block.

2. The method as claimed in claim 1, wherein each block of the one or more blocks includes 26 bits, 26 bits including 16 message bits and 10 parity bits, the syndrome includes a pattern of 10 bits, and the error includes a pattern of 26 bits.

3. The method as claimed in claim 1 and further including:
   performing at least one of the coherent demodulation and the differential demodulation of an input multiplexed signal, wherein performing the coherent demodulation includes at least one of correcting a phase offset in the input multiplexed signal, and correcting a frequency offset in the input multiplexed signal; and
   selecting output of one of the coherent demodulation and the differential demodulation as the demodulated signal based on at least one of detection of convergence of a phase locked loop of a demodulator of the receiver, detection of a lapse of a predefined time period, comparison of error vector magnitude of the output of the differential demodulation with that of the output of the coherent demodulation, and comparison of a block error rate obtained by use of the output of the differential demodulation with that obtained by use of the output of the coherent demodulation.

4. The method as claimed in claim 3, wherein correcting the phase offset includes:
   computing a first signal having the output of the coherent demodulation raised to a power greater than one;
   averaging the first signal to minimize noise; extracting angle associated with the first signal; modifying the angle by a predefined factor; and
   multiplying the input multiplexed signal with the angle modified by the predefined factor to yield the output of the coherent demodulation.

5. The method as claimed in claim 3, wherein correcting the frequency offset includes estimating the frequency offset in the input multiplexed signal; and clipping range of estimation of the frequency offset within a predefined range.

6. The method as claimed in claim 1, wherein grouping the bits into the one or more blocks includes: decoding the bits differentially if the output of the coherent demodulation is selected; and
   grouping differentially decoded bits into the one or more blocks.

7. The method as claimed in claim 1, wherein the predefined syndromes for the coherent demodulation include
   0000000000,
   0000000011,
   0000000101,
   0000001111,
   0000011011,
   0000110011,
   0001100011,
   0011000011,
   0110000011,
   1100000011,
   0100110100,
   1001101101,
   0000110010,
   0001100001,
   0011000111,
   0110001011,
   1100010011, 1011001110,
0101110100,
0100110010,
1001100001,
0000101010,
0001010001,
0010100111,
0000000001, and
1101100011;
the predefined syndromes for the differential demodulation include
0000000000,
0000000001,
0000000011,
0000000101,
0000001001,
0000010001,
0000100001,
0001000001,
0010000001,
0100000001,
0011101100,
0111011011,
1110110101,
1110000100,
1111100110,
1100100010,
1010101010,
0110111010,
1101110111,
0011101110,
0111011111,
1110111101,
1110010100,
1111000110, and
1101100010;
the predefined errors corresponding to the predefined syndromes for the coherent demodulation include
000000000000000000000000000,
110000000000000000000000000,
101000000000000000000000000,
111100000000000000000000000,
110110000000000000000000000,
110011000000000000000000000,
110001100000000000000000000,
110000110000000000000000000,
110000011000000000000000000,
110000001100000000000000000,
110000000110000000000000000,
110000000011000000000000000,
110000000001100000000000000,
110000000000110000000000000,
110000000000011000000000000,
110000000000001100000000000,
110000000000000110000000000,
110000000000000011000000000,
110000000000000001100000000,
110000000000000000110000000,
110000000000000000011000000,
110000000000000000001100000,
110000000000000000000110000,
110000000000000000000011000,
110000000000000000000001100,
110000000000000000000000110,
110000000000000000000000011,
100000000000000000000000001, and
000000000000000000000000001;
and the predefined errors corresponding to the predefined syndromes for the differential demodulation include
000000000000000000000000000,
100000000000000000000000000,
110000000000000000000000000,
101000000000000000000000000,
100100000000000000000000000,
100010000000000000000000000,
100001000000000000000000000,
100000100000000000000000000,
100000010000000000000000000,
100000001000000000000000000,
100000000100000000000000000,
100000000010000000000000000,
100000000001000000000000000,
100000000000100000000000000,
100000000000010000000000000,
100000000000001000000000000,
100000000000000100000000000,
100000000000000010000000000,
100000000000000001000000000,
100000000000000000100000000,
100000000000000000010000000,
100000000000000000001000000,
100000000000000000000100000,
100000000000000000000010000,
100000000000000000000001000,
100000000000000000000000100,
100000000000000000000000010, and
100000000000000000000000001,
one predefined error corresponding to one predefined syndrome.

8. The method as claimed in claim 1, wherein correcting the error includes performing a XOR operation between message bits of the block from the one or more blocks and the error.

9. The method as claimed in claim 1, wherein the receiver includes at least one of a radio data system unit and a radio broadcast data system unit.

10. A receiver for processing a signal, the receiver comprising:
one of a radio data system (RDS) demodulator and a radio data broadcast system (RBDS) demodulator to perform at least one of the coherent demodulation and the differential demodulation of an input multiplexed signal, each demodulator including:
an angle extractor that extracts angle associated with an output of the coherent demodulation,
a phase-locked loop that enables correction of at least one of a phase offset and a frequency offset in the input multiplexed signal, and that includes a limiter that clips range of estimation of the frequency offset within a predefined range,
a convergence detector coupled to the angle extractor to detect convergence of the phase-locked loop,
a unit that changes the angle by a predefined factor; and
a multiplier that multiplies a complex number corresponding to the angle changed by the predefined factor with the input multiplexed signal to generate the output of the coherent demodulation as a demodulated signal; and
one of a radio data system (RDS) error corrector and a radio data broadcast system (RBDS) error corrector responsive to a block of bits of the demodulated signal to:
compute a syndrome for the block;
identify error, corresponding to the syndrome, in the block based on type of demodulation of the demodulated signal, the type of demodulation including the coherent demodulation and the differential demodulation; and
correct the error in the block.

11. The receiver as claimed in claim 10, wherein each demodulator further includes: a computing unit that computes a first signal, the first signal including the output of the coherent demodulation raised to a power greater than one; and an averaging unit that averages the first signal to minimize noise and then provides the first signal to the angle extractor.

12. The receiver as claimed in claim 10 and further including: a controller, coupled to the convergence detector, to select an output of one of the coherent demodulation and the differential demodulation as the demodulated signal.

13. The receiver as claimed in claim 12 and further including a slicer that quantizes the demodulated signal after correction of at least one of the phase offset and the frequency offset to generate the bits from the demodulated signal; and a frame synchronizer that groups the bits into the block.

14. The receiver as claimed in claim 13 and further including a differential decoder, coupled between the slicer and the frame synchronizer, that differentially decodes the bits of the demodulated signal before grouping the bits into the block if the output of the coherent demodulation is selected.

15. The receiver as claimed in claim 10, wherein one of the RDS error corrector and the RBDS error corrector includes: a syndrome computing unit that computes the syndrome for the block; an identification unit that stores predefined syndromes and predefined errors for different type of demodulations, and matches the syndrome with the predefined syndromes to identify the error; and an exclusive OR gate that performs an exclusive OR operation of the error with message bits of the block to correct the error.

* * * * *